US006290011B1

(12) United States Patent
Langaker et al.

(10) Patent No.: US 6,290,011 B1
(45) Date of Patent: Sep. 18, 2001

(54) FRONT WHEEL/REAR WHEEL DRIVE CONVERTIBLE WHEELCHAIR

(75) Inventors: John T. Langaker, Fairway; DuWayne E. Kramer, Jr., Lake Quivera; Jerry L. Traylor, Olathe; James Ernst, Kansas City, all of KS (US)

(73) Assignee: Burke Mobility Products, Inc., Kansas City, KS (US)

(*) Notice: Subject to any disclaimer, the term of this patent is extended or adjusted under 35 U.S.C. 154(b) by 0 days.

(21) Appl. No.: 09/431,657

(22) Filed: Nov. 1, 1999

(51) Int. Cl.[7] ..................... B60K 1/02

(52) U.S. Cl. ..................... 180/65.1; 180/65.5; 180/329; 180/907

(58) Field of Search ..................... 180/65.5, 65.1, 180/11, 15, 16, 907, 329, 330; 280/250.1; 403/378, 379.3

(56) References Cited

U.S. PATENT DOCUMENTS

| | | | | |
|---|---|---|---|---|
| D. 397,645 | | 9/1998 | Schaffner . | |
| 4,951,766 | * | 8/1990 | Basedow et al. | 180/6.5 |
| 5,435,404 | | 7/1995 | Garin, III . | |
| 5,772,237 | | 6/1998 | Finch et al. . | |
| 5,944,131 | | 8/1999 | Schaffner et al. . | |
| 5,996,716 | * | 12/1999 | Montiglio et al. | 180/65.5 |
| 6,070,898 | * | 6/2000 | Dickie et al. | 280/304.1 |

OTHER PUBLICATIONS

Chauffeur Mobility Products, Viva Power Chair Owner's Manual, 24 pages, Rev. 02 –Jan. 9, 1998.

Days Medical Aids Ltd, DMA Brochure, 2 pages, prior to Nov. 1998.

Everest & Jennings, The O.C. Flyer Brochure, 4 pages, prior to Nov. 1998.

Fortress, Mini Catalog, 4 pages, prior to Nov. 1993.

HomeCareXtra Catalog, pp. 32–34, Entitled, *Mobility Focus*, prior to Nov. 1998.

(List continued on next page.)

*Primary Examiner*—Brian L. Johnson
*Assistant Examiner*—Tony Winner
(74) *Attorney, Agent, or Firm*—Shook, Hardy & Bacon, L.L.P.

(57) ABSTRACT

A powered wheelchair for disabled persons is provided that has a frame that has a first end and a second end. A seat support is coupled to the frame between the first and second ends. A pair of swivel wheels is coupled to the frame proximate the first end and a pair of motor driven wheels is connected to the frame proximate the second end. A motor is coupled to each of the driven wheels. The motors are adapted to allow a change in the rotational direction of the driven wheel to which it is coupled, wherein the rotational direction of the motors may be changed when the wheelchair is converted from a rear wheel drive wheelchair to a front wheel drive wheelchair. At least one battery is coupled to the motors, the battery providing power to the motors. An electronic controller is coupled to the motors and the battery. The controller has a user interface that is used to direct the speed and direction of the wheelchair. A seat assembly is reversibly coupled to the seat support and extends upwardly above the frame. The seat assembly has an extension member coupled thereto that is adapted to be reversed in direction relative to the seat support. The seat assembly further includes a seat base having a front edge. The seat base may thus be located so that the front edge is located generally over the swivel wheels to provide a rear wheel drive wheelchair and may be reversed so that the front edge is located generally over the driven wheels to provide a front wheel drive wheelchair. The rotational direction of the driven wheels may be reversed so that a forward command from the controller results in a different rotation when the wheelchair is in a rear wheel drive configuration as compared to a forward command when the wheelchair is in a front wheel drive configuration.

14 Claims, 2 Drawing Sheets

OTHER PUBLICATIONS

Hoveround Corporation, Hoveround Personal Mobility Vehicles MPV 4 Brochure, 2 pages, prior to Nov. 1998.
Hoveround Corporation, Hoveround Personal Mobility Vehicle Teknique Brochure, 2 pages, prior to Nov. 1998.
Invacare Corporation, Action Simply Smart, Simply Smart, PinDot, Storm, Series, Action Arrow, Action Ranger X, Action Torque, Action Range II, and Action Allegro Brochure, 6 pages, 1997.
Invacare Corporation, Action P7E Brochure, 2 pages, Form No. 97–251, 1997.
Invacare Corporation, Action Power 9000 Storm Series Brochure, 6 pages, Form No. 95–96, Nov. 1995.
Invacare Corporation, Action Storm Series Range X Brochure, 12 pages, Form No. 94–26 R020395, 1994.
Invacare Corporation, Action Storm Series Arrow & Torque Brochure, 20 pages, Form No. 94–09, 1994.
Leisure—Life, Inc., PaceSaver Sasso Power Chair Brochure, 2 pages, prior to Nov. 1998.
Merits Brochure, Sales@Merits.com.tw, prior to Dec. 27, 1999.
Permobil Inc, Chairman Corpus Brochure, 2 pages, prior to Nov. 1998.
Permobil Inc, Chairman Stander Brochure, 2 pages, prior to Nov. 1998.
Permobil Inc, Chariman MPS Brochure, 2 pages, prior to Nov. 1998.
Permobil Inc, Chairman Drivelink for Chairman Brochure, 2 pages, prior to Nov. 1998.
Permobil Inc, Chairman Miniflex Brochure, 2 pages, prior to Nov. 1998.
Permobil Inc, Chairman Mini Stander Brochure, 2 pages, prior to Nov. 1998.
Permobil Inc, Chairman Basic Brochure, 2 pages, prior to Nov. 1998.
Permobil Inc, The New Chairman Brochure, 2 pages, prior to Nov. 1998.
Permobil Inc, Chairman Robo For Kids Brochure, 2 pages, prior to Nov. 1998.
Pride Health Care, Inc., Jazzy Model 1100 Power Chair Brochure, 2 pages, prior to Nov. 1998.
Pride Health Care, Inc., Jazzy Model 1100 Power Chair Owner's Manual, 44 pages, prior to Nov. 1998.
Pride Health Care, Inc., Jazzy Model 1105 Power Chairs Brochure, 2 pages, prior to Nov. 1998.
Pride Health Care, Inc., Jazzy Model 1120 Power Chairs Brochure, 2 pages, prior to Nov. 1998.
Pride Health Care, Inc., Jazzy Model 1170 Power Chairs Brochure, 2 pages, prior to Nov. 1998.
Pride Health Care, Inc., Jazzy Power Chairs Brochure, 2 pages, prior to Nov. 1998.
Pride Health Care, Inc., Jazzy Power Chairs Brochure, 8 pages, prior to Nov. 1998.
Pride Health Care, Inc., Jazzy Power Chairs Brochure, 12 pages, prior to Nov. 1998.
Quickie Designs Inc., Quickie P210 Brochure, 2 pages, No. 903500, May 1995.
Quickie Designs Inc, Quickie P100/P110 Brochure, 2 pages, 1996.

* cited by examiner

FRONT WHEEL/REAR WHEEL DRIVE CONVERTIBLE WHEELCHAIR

STATEMENT REGARDING FEDERALLY SPONSORED RESEARCH OR DEVELOPMENT

Not Applicable.

CROSS REFERENCE TO RELATED APPLICATIONS

Not Applicable.

BACKGROUND OF THE INVENTION

The present invention relates to motor driven wheelchair for disabled persons. More specifically, the invention relates to a motor driven wheelchair that is convertible from a front wheel drive wheelchair into a rear wheel drive wheelchair and vice versa.

One of the options available to physically impaired persons is the powered wheelchair. The powered wheelchair offers increased mobility and convenience to these individuals. Two basic types of powered wheelchairs are the rear wheel drive type and the front wheel drive type. Each of these types of wheelchairs offers certain advantages and disadvantages.

A rear wheel drive wheelchair is typically easier to steer that a front wheel drive wheelchair. In other words, a rear wheel drive wheelchair is much easier to steer in a straight line. Also, it is generally understood that rear wheel drive wheelchairs are safer to operate at higher speeds, as compared to front wheel drive wheelchairs. These attributes make the rear wheel drive wheelchair more suitable for use in outdoor-type settings.

A front wheel drive wheelchair, on the other hand, is typically easier to maneuver in tight surroundings. A front wheel drive wheelchair has a smaller turning radius than a comparable rear wheel drive wheelchair. Thus, a front wheel drive wheelchair is typically preferred for indoor use. Purchasers of powered wheelchairs have heretofore selected, at the time of purchase, a wheelchair having the drive wheels best suited for their needs. This requires a wheelchair purchaser to elect at the time of purchase either a wheelchair that is best used either indoors or outdoors.

To accommodate the desires of different purchasers, the retailer of these wheelchairs will typically stock both front wheel and rear wheel drive wheelchairs. When a customer is shopping, he or she may then be shown a front wheel drive wheelchair and a rear wheel drive wheelchair, and will be allowed to select which of the two wheelchairs "feels" the best and seems best suited to the customer's needs. This practice requires the dealer to stock and display both types of wheelchairs which occupy a large amount of space and which are costly to keep in stock.

A powered wheelchair is therefore needed that is convertible, by the retailer or wheelchair customer, from a front wheel drive wheelchair to a rear wheel drive wheelchair. If the wheelchair is then configured for front wheel drive, and the customer would prefer a rear wheel drive wheelchair, the retailer or wheelchair customer could convert the wheelchair to a rear wheel drive configuration.

SUMMARY OF THE INVENTION

It is an object of the present invention to provide a powered wheelchair for disabled persons that can be easily converted from a front wheel drive wheelchair into a rear wheel drive wheelchair.

It is another object of the present invention to provide a powered wheelchair for disabled persons that has an adjustable footplate and that can be converted from a front wheel drive wheelchair into a rear wheel drive wheelchair.

According to the present invention, the foregoing and other objects are obtained by powered wheelchair for disabled persons that has a frame. The frame has a first end and a second end. A seat support is coupled to the frame between the first and second ends. A pair of swivel wheels is coupled to the frame proximate the first end and a pair of motor driven wheels is connected to the frame proximate the second end. A motor is coupled to each of the driven wheels. The motors are adapted to allow a change in the rotational direction of the driven wheel to which it is coupled, wherein the rotational direction of the motors may be changed when the wheelchair is converted from a rear wheel drive wheelchair to a front wheel drive wheelchair. At least one battery is coupled to the motors, the battery providing power to the motors. An electronic controller is coupled to the motors and the battery. The controller has a user interface that is used to direct the speed and direction of the wheelchair. A seat assembly is reversibly coupled to the seat support and extends upwardly above the frame. The seat assembly has an extension member coupled thereto that is adapted to be reversed in direction relative to the seat support. The seat assembly further includes a seat base having a front edge. The said seat base may thus be located so that the front edge is located generally over the swivel wheels to provide a rear wheel drive wheelchair and may be reversed so that the front edge is located generally over the driven wheels to provide a front wheel drive wheelchair. The rotational direction of the driven wheels may be reversed so that a forward command from the controller results in a different rotation when the wheelchair is in a rear wheel drive configuration as compared to a forward command when the wheelchair is in a front wheel drive configuration.

Additional objects, advantages, and novel features of the invention will be set forth in part in the description which follows, and in part will become apparent to those skilled in the practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

In the accompanying drawings which form a part of the specification and which are to be read in conjunction therewith and in which like reference numerals are used to indicate like parts in the various views.

DETAILED DESCRIPTION OF THE INVENTION

Figure 2:
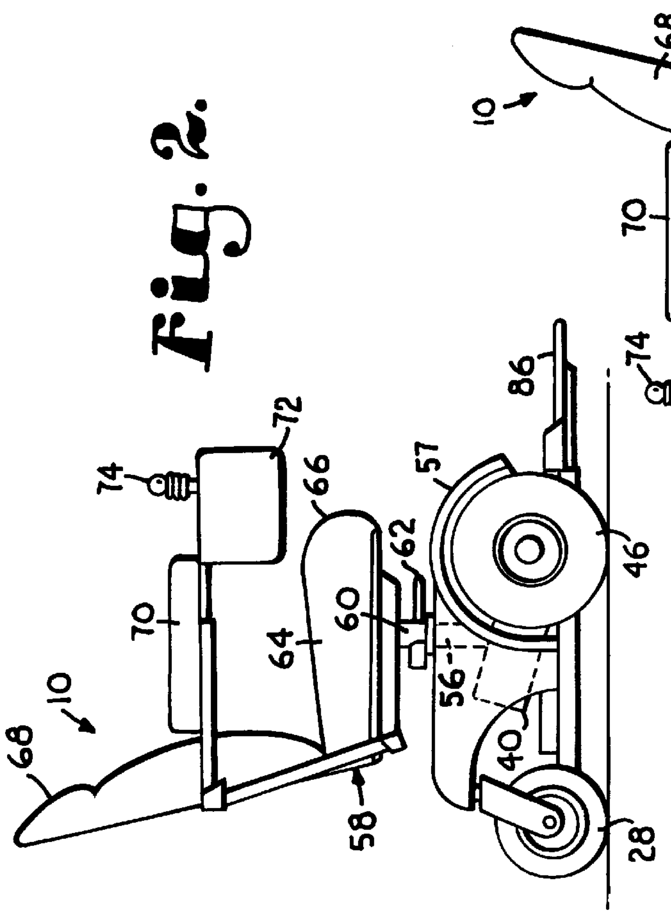
FIG. 2 is a is a side elevation view of the wheelchair of FIG. 1.
Figure 1:
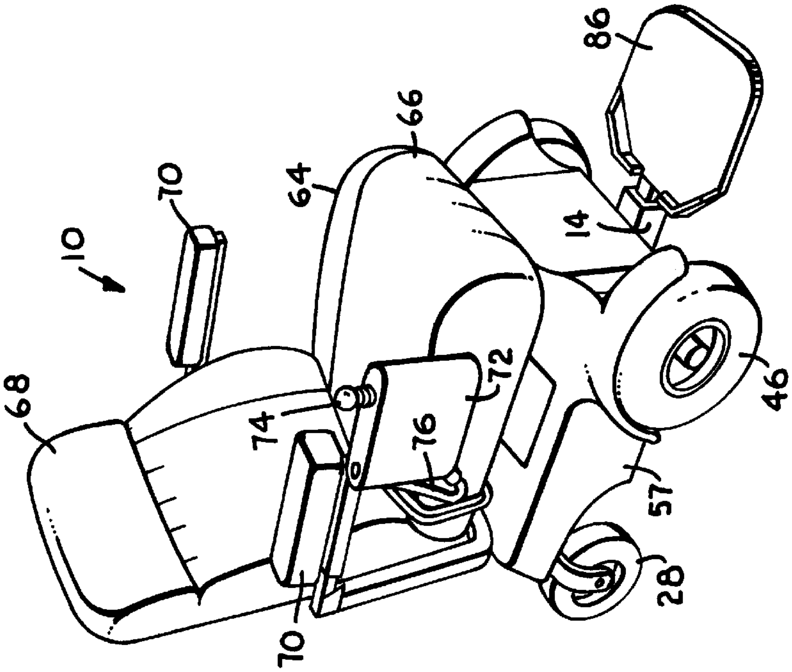
FIG. 1 is a perspective view of the wheelchair of the present invention, shown in a front wheel drive configuration.
Figure 4:
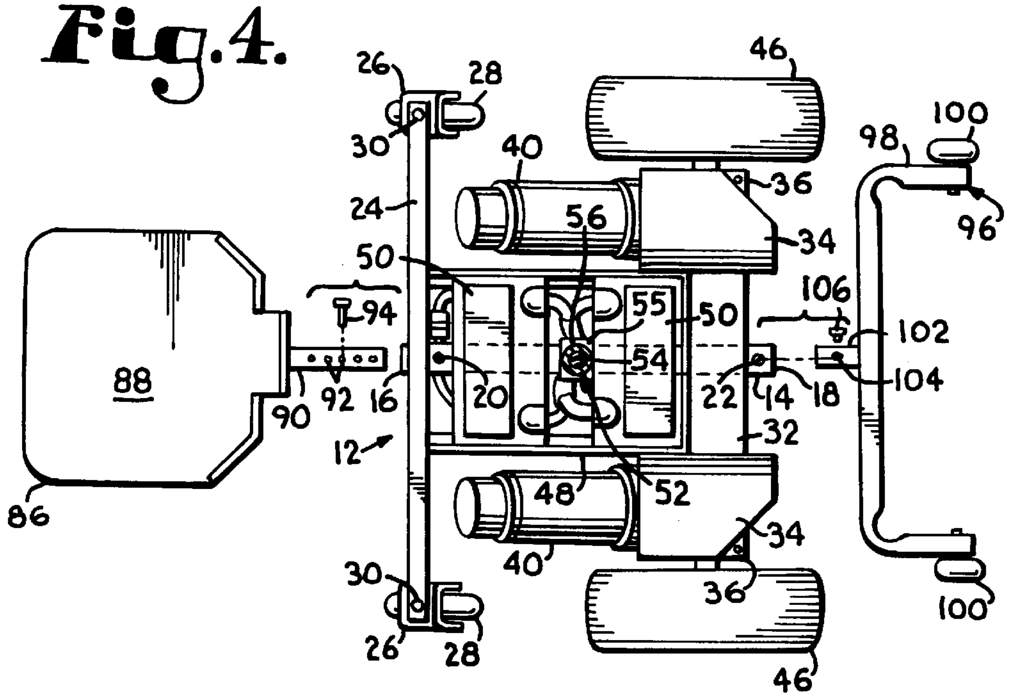
FIG. 4 is a top cross sectional view taken along line 4—4 of FIG. 3 and showing a partially exploded view of the components.

Referring initially to FIGS. 1 and 2, a powered wheelchair embodying the principles of this invention is broadly designated in the drawings by reference numeral 10. Wheelchair 10 is used by disabled persons to travel both inside and outside, and provides disabled persons increased mobility. As best seen in FIG. 4, wheelchair 10 includes a frame 12 on which the components of chair 10 are mounted. Frame 12 includes a center tubing member 14 that has a first end 16 and a second end 18. Tubing 14 is preferably made of a square steel tubing, defining an open interior portion. A first connecting hole 20 is disposed through tubing 14 generally adjacent first end 16 and a second connecting hole 22 is disposed through tubing 14 generally adjacent second end 18.

A first support arm 24 is pivotally coupled to tubing 14 adjacent first end 16. Support arm 24 extends above tubing 14 and is oriented perpendicularly thereto. Pivotally held on each outer end of arm 24 is a caster fork 26. A swivel caster wheel 28 is rotatingly coupled to each fork 26. Wheels 28 are preferably pneumatic tires, it being understood that other types of wheels would be suitable as well. Wheels 28 are therefore free to pivot about a vertical axis 30, as seen in FIG. 4.

Figure 5:
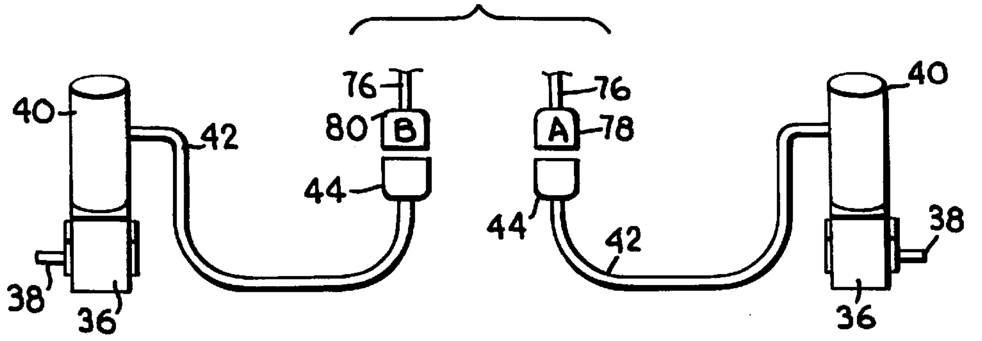
FIG. 5 is a schematic view of the wiring configuration for a rear wheel drive mode for the wheelchair of FIG. 1.
Figure 6:
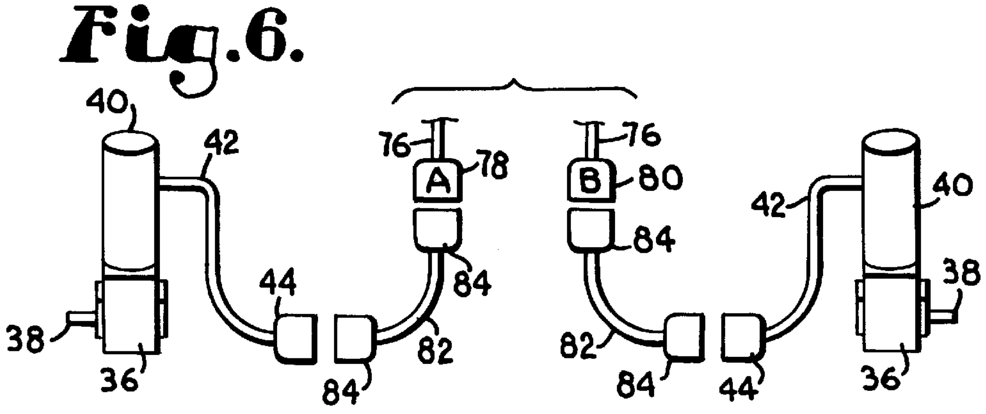
FIG. 6 is a schematic view of the wiring configuration for a front wheel drive mode for the wheelchair of FIG. 1.

A second support arm 32 is rigidly coupled to tubing 14 generally adjacent second end 18. Arm 32 extends perpendicularly to tubing 14 and is mounted to extend above tubing 14. A motor mount 34 is coupled to each outer end of arm 32. As best seen in FIGS. 4–6, a gearbox 36 is mounted on each motor mount 34. A drive axle 38 extends outwardly from each gearbox 36, generally perpendicularly to tubing 14. Also coupled to each gearbox 36 is an electric motor 40. As seen in FIGS. 5 and 6, each motor 40 has an electrical conduit 42 extending therefrom that has a quick-disconnect type electrical coupling 44 on its terminal end. Quick-disconnect 44 matingly fits with another coupling extending from a controller to electrically couple each motor 40 to the controller, as is more fully discussed below. Each drive axle 38 has a drive wheel 46 mounted thereto. Drive wheels 46 are preferably ten inch diameter pneumatic tires, it being understood that other types and sizes of wheels would also be suitable.

A battery tray 48 is rigidly connected to tubing 14 between arms 24 and 32. Tray 48 provides a stable surface which holds a pair of batteries 50. Batteries 50 are preferably twelve volt 30 A/hr deep cycle batteries and are used to provide power to wheelchair 10. Further, batteries 50 are preferably rechargeable, with a range of up to 23 miles, depending on conditions.

As best seen in FIGS. 4, a seat support 52 is provided on wheelchair 10. Support 52 includes a round seat post 54 that is rigidly secured to a rectangular plate 55 that is in turn rigidly secured to tubing 14. The position of post 54 relative to wheels 28 and 46 is important to allow wheelchair 10 to be operated in either a front wheel drive mode or a rear wheel drive mode. Post 54 determines the location of the occupant of wheelchair 10. Therefore, to allow wheelchair 10 to be operated in either mode, post 54 is located between the wheels 28 and 46 and slightly closer to the rotational axis for wheels 46 than support ann 24 for wheels 28. The exact location of post 54 depends on a number of factors, such as the weight of the rider, the weight of batteries 50, and the height of the seat. The seat is located such that there is an acceptable weight distribution on wheels 28 and 46 in either the front wheel drive mode or the rear wheel drive mode.

Figure 3:
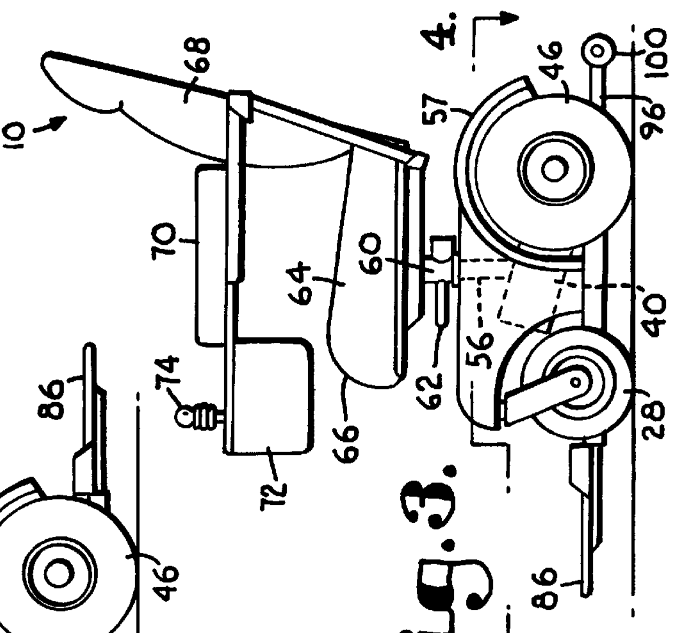
FIG. 3 is a side elevation view similar to FIG. 2, shown in a rear wheel drive configuration.

A round tubing member 56 is telescopingly disposed over the outside of post 54, as best seen in FIGS. 2 and 3. Member 56 is preferably bolted to post 54 in one of a number of positions. The positioning of member 56 on post 54 determines the height of the seat of wheelchair 10, and may be adjusted according to the desires of the user. A decorative and protective hood 57 is attached to frame 12 to hide the working components of wheelchair 10 from view, such as motors 40 and batteries 50. Hood 57 is preferably a thin plastic material and is preferably removably attached to frame 12 such as by a series of hook and loop fastening devices.

As best seen in FIGS. 2 and 3, a seat assembly 58 is removably coupled to tubing member 56. The lower end of seat assembly 58 has an extension member 60 extending therefrom. Member 60 is preferably a swivel-lock mechanism. Member 60 extends over tubing member 56 and is equipped with a locking handle 62. Handle 62 is operable, as is known to those of skill in the art, to selectively lock seat assembly 58 in place relative to tubing member 56. In other words, in one position, handle 62 allows seat assembly 58 to rotate about tubing member 56. In a second position, handle 62 locks seat assembly 58 in place, the importance of which is further discussed below. Seat assembly 58 further has a padded seat base 64 with a front edge 66 located directly above swivel-lock 60. As known to those of skill in the art, a seat back 68 is attached to base 64 and extends upwardly therefrom. Similarly, a pair of arms 70 are attached to seat base 64 to provide support for the arms of the user of wheelchair 10.

As best seen in FIG. 1, an electronic controller 72 is coupled to one of the arms 70 on seat assembly 58. Controller 72 is preferably programmable and is equipped with a joystick 74 that is used to operate wheelchair 10, such as by dictating the speed and direction of the wheelchair. A suitable controller is the model DL WHEELCHAIR CONTROLLER, made by Dynamic of Christchurch, New Zealand, it being understood that other models and makes of controllers would be suitable as well. An electrical wiring harness 76 is electrically coupled to controller 72 and extends downwardly therefrom. Harness 76 is electrically coupled to each battery 50 and ultimately to each motor 40. Although not shown, harness 76 is also preferably provided with a disconnect coupling between controller 72 and batteries 50, so that seat assembly 58 may be removed from seat support 52 after the disconnect in harness 76 is uncoupled. To facilitate the electrical coupling to the motors 40, harness 76 is provided with a first harness plug 78, labeled "A" in FIGS. 5 and 6, and a second harness plug 80, labeled "B" in FIGS. 5 and 6. Plugs 78 and 80 are designed to matingly fit with quick disconnects 44 that extend from motors 40. As seen in FIG. 6, a pair of electrical jumpers 82 are used to reverse the polarity of motors 40 when wheelchair 10 is being converted from a rear wheel drive configuration to a front wheel drive configuration, as is more fully discussed below. Each jumper 82 is equipped with end plugs 84 that are designed to matingly fit with quick disconnects 44 and plugs 78 and 80.

As best seen in FIG. 4, wheelchair 10 includes a footplate 86 that is removably connected to tubing 14. More specifically, footplate 86 includes a generally rectangular footrest 88, upon which the user of wheelchair 10 may place his or her feet. Extending rearwardly from footrest 88 is a connecting end 90. End 90 is preferably rigidly secured to footrest 88, such as by welding, and is preferably made from a square steel tubing. A series of connecting holes 92 are disposed through end 90 and are generally evenly spaced from one another. Footplate 86 is connected to wheelchair 10 by placing end 90 within either first end 16 or second end 18 of tubing 14. When wheelchair 10 is in a rear wheel drive configuration, end 90 is placed within first end 16 such that first connecting hole 20 is in alignment with the desired connecting hole 92. It can be seen that the location of footplate 90 relative to wheelchair 10 can be adjusted by aligning a different hole 92 with hole 20. To couple footplate 86 to tubing 14, a releasable pull-pin 94 is provided. Pin 94 is placed through hole 20 and the aligned hole 92. In use, pin 94 is preferably secured to tubing 14 so that pin 94 always remains on wheelchair 10, eliminating the possibility of pin 94 becoming lost. Alternatively, when wheelchair 10 is in a front wheel drive configuration, end 90 is placed within second end 18 of tubing 14, and hole 22 is aligned with the desired hole 92. Pin 94 is then placed through the holes to hold footplate 86 on wheelchair 10.

Although not shown, it is known to those of skill in the art to replace footplate 86 with leg-riggings that are coupled directly to the seat assembly 58. In this construction, the leg-riggings travel with seat assembly 58. In other words, when seat 58 is repositioned 180 degrees from rear wheel drive configuration to front wheel drive configuration, the leg-riggings will automatically be repositioned as well.

As best seen in FIG. 4, wheelchair 10 is also provided with a rear anti-tip wheel frame 96. Frame 96 has a generally U-shape member 98 which has a pair of anti-tip wheels 100 coupled thereto. Wheels 100 are preferably two-inch, solid rubber wheels, it being understood that other sizes and types of wheels would be suitable as well. Member 98 is preferably formed from square steel tubing. Rigidly secured in the middle of member 98 and extending rearwardly therefrom is a connecting leg 102 that is sized to fit within tubing 14. Leg 102 can be secured to member 98 using any suitable attaching mechanism, such as by welding. A hole 104 is disposed through leg 102 that is designed to align with second connecting hole 22 in tubing 14. Only one hole 104 is provided so that frame 96 is properly located relative to tubing 14 on wheelchair 10. In use, frame 96 is installed when wheelchair 10 is in a rear wheel drive configuration, as shown in FIG. 3. To secure frame 96 in place, leg 102 is placed within tubing 14 and a releasable pull-pin 106 is placed through holes 22 and 104.

Wheelchair 10 is convertible from a rear wheel drive configuration, as shown in FIG. 3, to a front wheel drive configuration, as shown in FIG. 2. To complete this conversion, anti-tip frame 96 is removed from tubing 14 by removing pull-pin 106. When pull-pin 106 is removed, leg 102 is free to slide within tubing 14. Frame 96 is thus removed merely by sliding it outwardly away from tubing 14.

It is also necessary to relocate footplate 86 from first end 16 to second end 18. This relocation is accomplished by removing pull-pin 94 from engagement within holes 20 and 92. Connecting end 90 is then free to slide within first end 16 of tubing 14. After footplate 86 has been completely removed from tubing 14, pull-pin 94 is preferably placed back within hole 20 so that it is not loose on wheelchair 10. Footplate 86 is then moved to the other end of wheelchair 10 and connecting end 90 is aligned with second end 18 of tubing 14. End 90 is placed within tubing 14 on second end 18 such that footplate 86 is in the desired location and hole 22 is aligned with one of the connecting holes 92. Pull-pin 106 is then placed through holes 22 and 92 to secure footplate 86 in place.

In order to transform wheelchair 10 from a rear wheel drive to a front wheel drive wheelchair, the polarity of motors 40 also needs to be reversed. This is needed so that when the user indicates, through joystick 74, a desired forward movement, wheelchair 10 will travel forward rather than backward. To accomplish this, seat assembly 58 is removed from wheelchair 10 by releasing locking handle 62. Hood 57 is then removed from frame 12 by pulling upwardly, releasing the hook and loop fastening devices. The removal of hood 57 allows access to the electrical connection of harness 76 to motors 40. As best seen in FIG. 5, when wheelchair 10 is in a rear wheel drive configuration, harness plug 80 is coupled to the motor 40 that is driving the left-hand wheel 46 and harness plug 78 is coupled to the motor 40 that is driving the right-hand wheel 46. To convert motors 40 to a front wheel drive operation, plugs 78 and 80 are removed from disconnects 44. An electrical jumper 82 is then connected between harness plug 78 and the disconnect 44 associated with the motor 40 driving the left-hand wheel 46, as shown in FIG. 6. Similarly, another jumper 82 is connected between harness plug 80 and the disconnect 44 associated with the motor 40 driving the right-hand wheel 46. The use of jumpers 82 reverses the polarity of motors 40 so that operation of joystick 74 on controller 72 signals motors 40 to operate in the intended direction. What is important in this procedure is that the controller 72 and the motors 40 communicate properly so that when a forward command is given, wheelchair 10 will travel in a forward direction. The hood 57 and seat assembly 58 are then reinstalled on wheelchair 10.

It is also possible to reverse the direction of the motors 50 through controller 72. To accomplish this, a controller 72 must be used that allows the polarity of motors 50 to be switched through a switch or button on controller 72.

Seat assembly 58 also needs to be relocated to a position facing the opposite direction. To accomplish this, locking handle 62 of swivel-lock 60 is released, allowing seat base 64, back 68 and arms 70 to rotate together about tubing member 56. After seat assembly 58 has been moved from the position shown in FIG. 3 to the position shown in FIG. 2, handle 62 is engaged to lock the seat in place. In the rear wheel drive configuration, front edge 66 of seat base 64 is located generally over wheels 28, and in the front wheel drive configuration, front edge 66 is located generally over wheels 46. While the seat has been described as using a swivel-lock for member 60, other mechanisms may be used to attach seat assembly 58 to scat support 52. The mechanism merely needs to allow seat assembly to be relocated to face 180 degrees in the opposite direction. For example, seat support 52 could include a square post, with a corresponding piece of square tubing on seat assembly 58.

Finally, it is desirable to reprogram controller 72 when converting from a rear wheel drive configuration to a front wheel drive configuration. This is accomplished by accessing the programmable features of controller 72. A change is made in the program to compensate for the different characteristics between a rear wheel drive wheelchair and a front wheel drive wheelchair. The basic change involves a change in the top speed attainable by the wheelchair. Preferably, wheelchair 10 in a front wheel drive mode will operate at only about eighty-five percent of the full speed of wheelchair 10 in a rear wheel drive mode, depending on user preferences, this percentage may be more or less. The changing of programs may also be accomplished by providing two programs within controller 72 and providing controller 72 with a switch that allows the dealer or user to toggle between programs by merely operating the switch.

All of the above changes are preferably accomplished at the wheelchair dealership. However, with proper instruction, the above changes could also be executed by the user of wheelchair 10 in the home environment. Wheelchair 10, as described above, offers one wheelchair that can operate in either a front wheel drive mode or a rear wheel drive mode. This allows a retailer of wheelchairs to stock a single model, while being able to accommodate the desires of a variety of wheelchair purchasers. Moreover, the wheelchair purchaser is provided with a wheelchair that can be converted to a wheelchair providing different characteristics, if the needs of the purchaser change in the future.

From the foregoing, it will be seen that this invention is one well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention what is claimed is:

1. A powered wheelchair for use by disabled persons, comprising:

a frame, said frame having a first end and a second end, said frame including at least one tubing member having a first end and a second end;

a seat support coupled to said frame between said first end and said second end;

a pair of swivel wheels coupled to said frame proximate said first end;

a pair of motor driven wheels coupled to said frame proximate said second end;

a pair of motors, each of said motors being coupled to a corresponding driven wheel, said motors being adapted to allow a change in the rotational direction of the driven wheel to which it is coupled, wherein the rotational direction of said motors may be changed when said wheelchair is converted from a rear wheel drive wheelchair to a front wheel drive wheelchair;

at least one battery coupled to said motors, said batteries providing power to said motors;

an electronic controller coupled to said motors and said at least one battery, said controller having a user interface usable to direct the speed and direction of the wheelchair;

a seat assembly reversibly coupled to said seat support and extending upwardly above said frame, said seat assembly having an extension member coupled thereto and adapted to be reversed in direction relative to said seat support, said seat assembly further including a seat base having a front edge, and at least one footplate adapted to be removably received within either said first end or said second end of said tubing member of said frame, and a first coupling mechanism associated with said frame and said footplate, said first coupling mechanism removably coupling said footplate to said tubing member, wherein said footplate may be coupled to said first end of said tubing member when said seat is positioned to provide a rear wheel drive wheelchair and wherein said footplate may be repositioned to said second end of said tubing member when said seat is positioned to provide a front wheel drive wheelchair, and wherein said seat base may be located so that said front edge is located generally over said swivel wheels to provide a rear wheel drive wheelchair and wherein said seat base may be reversed so that said front edge is located generally over said driven wheels to provide a front wheel drive wheelchair, and wherein the rotational direction of the driven wheels may be reversed so that a forward command from the controller results in a different rotation when the wheelchair is in a rear wheel drive configuration as compared to a forward command when the wheelchair is in a front wheel drive configuration.

2. The wheelchair of claim 1, wherein said extension member is a swivel-lock mechanism.

3. The wheelchair of claim 2, wherein said first coupling mechanism is applicable and releasable by hand without the use of any tools.

4. The wheelchair of claim 3, wherein said footplate includes a connecting end shaped to matingly connect with said tubing member, said connecting end having at least one first hole passing therethrough, and wherein said first coupling mechanism includes a second hole passing through said tubing member proximate said first end and located to align with said first hole, and a third hole passing through said tubing member proximate said second end and located to align with said first hole, said coupling mechanism further including a releasable pull pin being disposed through either said first and second holes or said first and third holes when the wheelchair is in an assembled condition.

5. The wheelchair of claim 4, wherein said connecting end has a plurality of said first holes spaced therealong so that the position of said footplate relative to said frame can be adjusted.

6. The wheelchair of claim 5, wherein said controller is programmable, and wherein said controller has at least one program usable when said wheelchair is in a front wheel drive configuration and at least one program usable when said wheelchair is in a rear wheel drive configuration.

7. The wheelchair of claim 1, further comprising an anti-tip frame usable when the wheelchair is in a rear wheel drive configuration, said anti-tip frame being generally u-shaped with a rearwardly extending connecting leg shaped to matingly and removably fit within said second end of said tubing member.

8. The wheelchair of claim 1, wherein said seat support is nearer to the rotational axis of said driven wheels than the rotational axis of said swivel wheels.

9. A powered wheelchair for use by disabled persons, comprising:

a frame, including at least one tubing member having a first end and a second end;

a seat support coupled to said frame between said first end and said second end;

a pair of swivel wheels coupled to said frame proximate said first end;

a pair of motor driven wheels coupled to said frame proximate said second end;

a pair of electric motors, each of said motors being coupled to a corresponding driven wheel, said motors having a quick-disconnect terminal that allows the polarity of each motor to be easily changed;

at least one battery coupled to said motors, said battery providing power to said motors;

a seat assembly rotatably coupled to said seat support and extending upwardly above said frame said seat assembly including a swivel-lock mechanism that is adapted to secure said seat assembly in place relative to said seat support, said seat assembly further including a seat base having a front edge, and at least one footplate adapted to be removably received within either said first end or said second end of said tubing member of said frame, and a first coupling mechanism associated with said frame and said footplate, said first coupling mechanism removably coupling said footplate to said tubing member, wherein said footplate may be coupled to said first end of said tubing member when said seat is positioned to provide a rear wheel drive wheelchair and wherein said footplate may be repositioned and coupled to said second end of said tubing member when said seat is positioned to provide a front wheel drive wheelchair, and wherein said seat base may be rotated and locked in place with said swivel-lock mechanism so that said front edge is located generally over said swivel wheels to provide a rear wheel drive wheelchair and wherein said seat base may be rotated and locked in place with said swivel-lock mechanism so that said front edge is located generally over said driven wheels to provide a front wheel drive wheelchair, and wherein the polarity of said motors may be changed when said wheelchair is converted from a rear wheel drive wheelchair to a front wheel drive wheelchair.

10. The wheelchair of claim 9, further comprising a programmable electronic controller coupled to said quick disconnects of said motors, said controller having a user interface usable to direct the speed and direction of the wheelchair, said controller having at least one program usable when said wheelchair is in a front wheel drive configuration and at least one program usable when said wheelchair is in a rear wheel drive configuration.

11. The wheelchair of claim 10, wherein said footplate includes a connecting end shaped to matingly connect with said tubing member, said connecting end having at least one first hole passing therethrough, and wherein said first coupling mechanism includes a second hole passing through said tubing member proximate said first end and located to align with said first hole, and a third hole passing through said tubing member proximate said second end and located to align with said first hole, said coupling mechanism further including a releasable pull pin being disposed through either said first and second holes or said first and third holes when the wheelchair is in an assembled condition.

12. The wheelchair of claim 11, wherein said connecting end has a plurality of said first holes spaced therealong so that the position of said footplate relative to said frame can be adjusted.

13. The wheelchair of claim 12, further comprising an anti-tip frame usable when the wheelchair is in a rear wheel drive configuration, said anti-tip frame being generally u-shaped with a rearwardly extending connecting leg shaped to matingly and removably fit within said second end of said tubing member.

14. The wheelchair of claim 13, wherein said seat support is nearer to the rotational axis of said driven wheels than the rotational axis of said swivel wheels.

* * * * *